Nov. 6, 1956

C. J. BASHE 2,769,971

RING CHECKING CIRCUIT

Filed Oct. 4, 1954

INVENTOR.
CHARLES J. BASHE
BY
Edwin Lester
AGENT

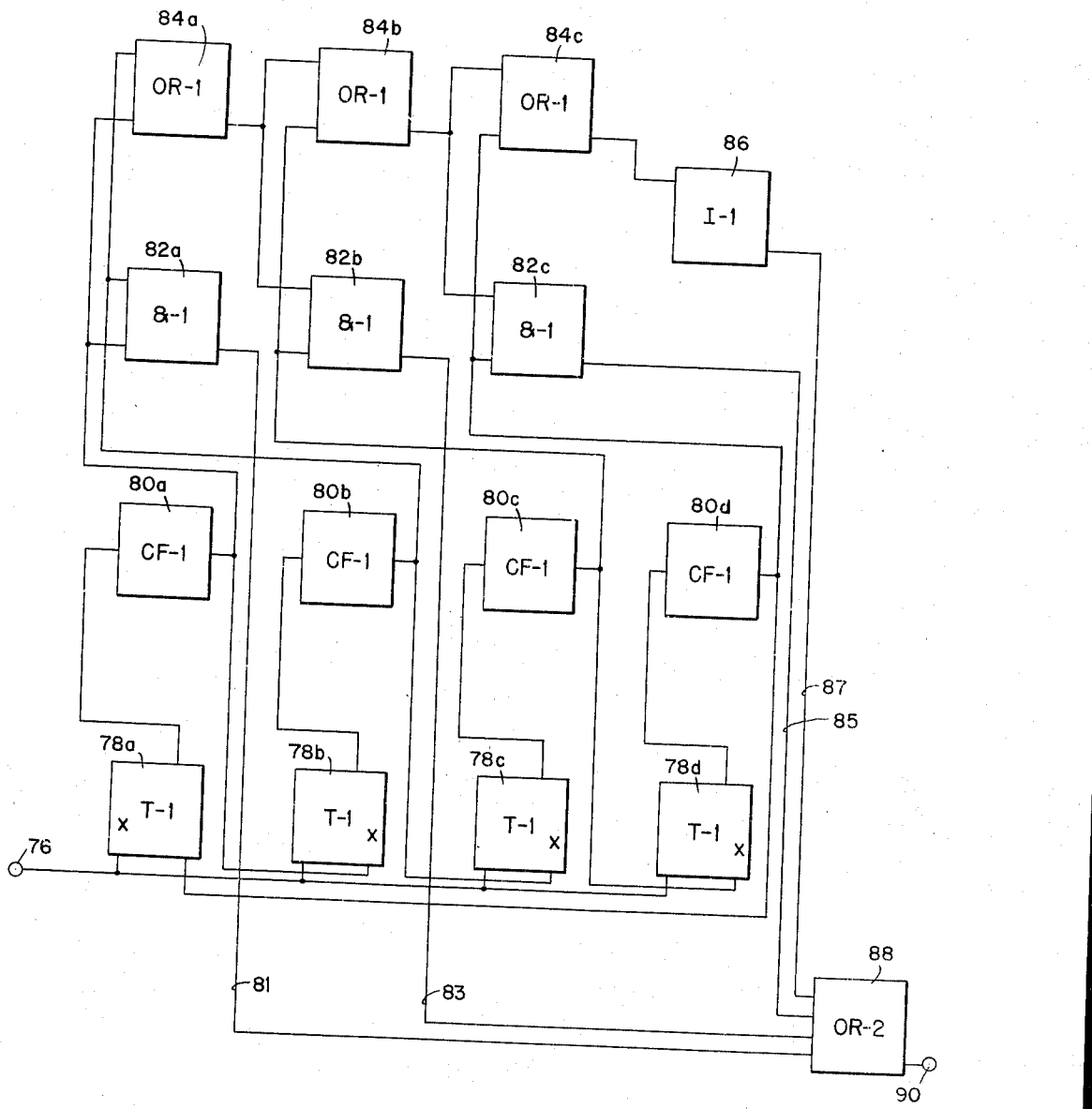

United States Patent Office 2,769,971
Patented Nov. 6, 1956

2,769,971
RING CHECKING CIRCUIT

Charles J. Bashe, Poughkeepsie, N. Y., assignor to International Business Machines Corporation, New York, N. Y., a corporation of New York Application October 4, 1954, Serial No. 460,090

7 Claims. (Cl. 340—213)

This invention relates to checking circuits and more particularly to a circuit for checking the storage condition of a plurality of storage devices.

Counting and timing circuitry is generally composed of a ring of cascaded bistable devices. The bistable devices usually take the form of electronic trigger circuits having two conditions of stability designated as the "on" or set condition and the "off" or reset condition. The "on" condition of a trigger indicates that an information item is stored therein while the "off" condition indicates that no information item is stored in that particular trigger. Usually one and only one trigger in the ring is in the "on" condition at any one instant of time such that when a pulse is applied to the ring, the effect is to shift the one trigger which is in the "on" condition to the "off" condition. In shifting from the "on" to the "off" condition, the trigger generates a signal which is applied to the next succeeding trigger causing it to be set to the "on" condition. Thus, in a similar fashion, if a series of pulses is applied to the ring, the "on" condition progresses or steps from trigger to trigger of the ring. Occasionally, due to component failures or breakdown either none or more than one of the plurality of bistable devices is in the "on" condition.

Accordingly, it is an object of the present invention to check whether one and only one out of a plurality of bistable devices is in the "on" condition.

Another object of the invention is to provide a predetermined indication whenever one and only one of a plurality of triggers is in the "on" condition.

Still another object of the invention is the provision of a checking circuit for checking the storage condition of a plurality of triggers and producing an error signal whenever none or more than one of the plurality of triggers are in the "on" condition.

According to the present invention, a checking circuit is provided for checking whether one and only one of a plurality of bistable devices is in the "on" condition comprising a first sensing means for sensing whether none of the plurality of bistable devices are in the "on" condition, a second sensing means for sensing whether more than one of a plurality of bistable devices are in the "on" condition and means operatively coupled to the sensing means for producing an error signal whenever none or more than one of the plurality of bistable devices are in the "on" condition.

Other objects of the invention will be pointed out in the following description and claims and illustrated in the accompanying drawings, which disclose by way of examples, the principle of the invention and the best mode, which has been contemplated of applying that principle.

In the drawings:

Figure 6 is a block diagram of the storage checking circuit.

Reference is now made to the drawings and more particularly to Figs. 1 to 5, inclusive, which illustrate the schematics of the symbols hereinafter employed to simplify the detailed description of the invention.

Figure 1:
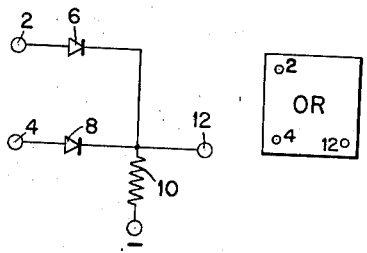
Figure 1 illustrates both the block symbol and the schematic circuit of a positive "or" circuit used in the invention.

Referring first to Fig. 1, there is illustrated the block symbol of a positive "or" circuit and also the details of the circuit within the block. The positive "or" circuit has the property of producing a positive output signal whenever a positive signal is applied to either or both of the input terminals thereof.

The positive "or" circuit is composed of diodes 6 and 8 and resistor 10. The diodes 6 and 8 include anodes connected to the input terminals 2 and 4, respectively, and interconnected cathodes coupled to a negative supply bus via the resistor 10. The junction of the cathodes of the diodes 6 and 8 and resistor 10 is also connected to the output terminal 12. The input terminals 2 and 4 are normally biased such that the diodes 6 and 8 are in conductive states and the output terminal 12 is normally at a relatively negative potential. If a positive signal is applied to either or both of the input terminals 2 and 4 there is an increased flow of current through the resistor 10 thereby raising the potential of the output terminal 12. While only two input terminals have been shown in Figure 1, it is to be understood that an "or" circuit can have any number of input terminals so long as a diode is provided between each input terminal and the output terminal. The positive "or" circuit is hereinafter represented by a block containing the alphabetic characters "or" and a numerical designation i. e. "or–1".

Figure 2:
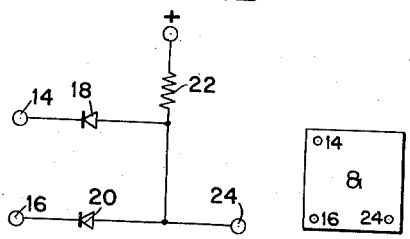
Figure 2 shows both the block symbol and the schematic circuit of a positive "and" circuit used in the invention.

Referring now to Figure 2 there is illustrated the block symbol of a positive "and" circuit and also the details of the circuit within the block. The positive "and" circuit has the property of producing a positive output signal whenever there is a coincidence of positive signals at both of the input terminals thereof.

The positive "and" circuit is composed of the diodes 18 and 20 and the resistor 22. The diodes 18 and 20 include cathodes connected to the input terminals 14 and 16, respectively, and interconnected anodes coupled to a positive supply bus via the resistor 22. The junction of the anodes of the diodes 18 and 20 and resistor 22 is also connected to the output terminal 24. The input terminals 14 and 16 are normally biased such that the diodes 18 and 20 are in conductive states and the output terminal 24 is normally at a relatively negative potential. During conduction, the anodes of the diodes 18 and 20 are at a potential more nearly that of their respective cathodes, namely, a negative potential. If a positive signal is applied to either of the input terminals 14 and 16 the diode to which that signal is applied disconnects as the cathode is now at a more positive potential than the anode. However, the potential at the output terminal 24 remains negative since the other diode is still conducting. If positive signals are applied to both of the input terminals 14 and 16 the diodes 18 and 20 both disconnect. Consequently, the potential of the output terminal 24 starts to rise toward that of the positive supply bus until the potential reaches approximately that of the positive input signals whereupon the diodes 18 and 20 conduct and the potential at the output terminal 24 stops rising and is maintained at that of the positive input signals. The positive "and" circuit is hereinafter represented by a block containing the symbol for an ampersand and a numerical designation i. e. &–1.

Figure 3:
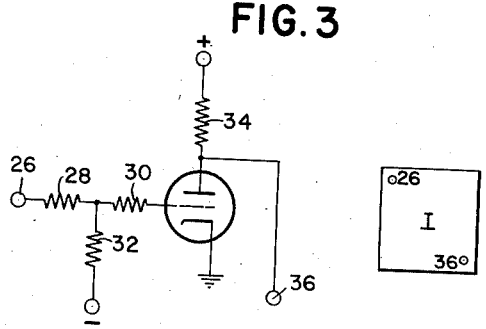
Figure 3 illustrates both the block symbol and the schematic circuit of an inverter I used in the invention.

Referring now to Figure 3 there is illustrated the block symbol of an inverter and also the details of the circuit within the block. The inverter has the property of inverting the polarity of the signal applied thereto.

The inverter includes a triode having a plate connected directly to the output terminal 36 and via resistor 34 to a positive supply bus. The grid of the inverter is coupled via resistors 30 and 32 to a negative supply bus, while the junction of resistors 30 and 32 is connected via resistor 28 to the input terminal 26. The cathode of the inverter is connected to ground. If a positive signal is applied to the input terminal 26 a negative signal results at the output terminal 36 and vice versa. The inverter is hereinafter represented by a block containing the alphabetic character I and a numerical designation i. e. I–1.

Figure 4:
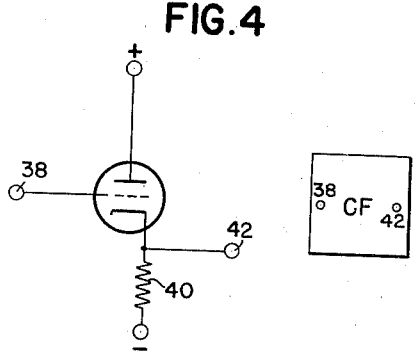
Figure 4 shows both the block symbol and the schematic circuit of a cathode follower CF used in the invention.

Referring now to Figure 4 there is shown the block symbol of a cathode follower and also the details of the circuit within the block. The cathode follower functions as a coupling means between signal transmitting stages so as to prevent loading of the signal transmitting stages.

The cathode follower includes a triode having a plate connected to the positive supply bus, a grid connected to the input terminal 38 and a cathode connected to the output terminal 42 and via resistor 40 to the negative supply bus. The cathode follower output follows the grid input potential and hence is of the same polarity. The cathode follower is hereinafter represented by a block containing the alphabetical characters CF and a numerical designation i. e. CF–1.

Figure 5:
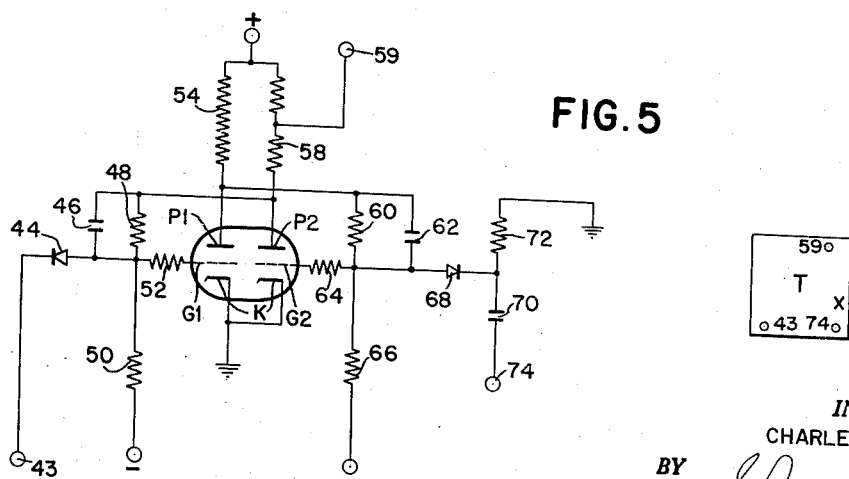
Figure 5 illustrates both the block symbol and the schematic circuit of an electronic trigger T used in the invention.

Referring now to Figure 5 there is illustrated the block symbol of a trigger and also the details of the circuit within the block.

The trigger has two states of stability for fixed values of supply potentials and circuit components. One stable state of the trigger is termed the "off" or reset condition and exists when one tube is conductive while the other is nonconductive and the output terminal is at a relatively negative potential. The second stable state is termed the "on" or set condition and exists when the tube which was previously conductive is now non-conductive while the tube which was previously non-conductive is now conductive and the output terminal is at a relatively positive potential.

The trigger comprises two cross-coupled triodes in which the plate P1 is cross-coupled via resistors 60 and 64 to the grid G2, while the plate P2 is likewise cross-coupled to the grid G1 via the resistors 48 and 52. Each of the resistors 48 and 60 is shunted by capacitors 46 and 62, respectively. The junction of resistors 48 and 52 and capacitor 46 is connected via resistor 50 to a negative supply bus. Likewise, the junction of resistors 60 and 64 and capacitor 62 is coupled via the resistor 66 to a negative supply bus. The cathodes K are grounded while each of the plates P1 and P2 are connected through plate resistors 54 and 58, respectively, to a positive supply bus. The output terminal 59 is connected to a tap of the plate resistor 58. The reset terminal 43 is connected via the isolating diode 44 to the junction of resistors 48, 50 and 52 and capacitor 46. The set terminal 74 is coupled via a differentiating circuit, comprised of capacitor 70 and resistor 72, and isolating diode 68 to the junction of resistors 60, 64 and 66. The isolating diodes only permit negative signals to pass to the grids G1 and G2.

If the right triode is conducting and a negative signal is applied to the set terminal 74, the right triode is cut off. As the right triode stops conducting, the voltage at the plate P2 goes positive, which voltage through the cross-coupling previously described, drives the grid G1 relatively positive so that the left triode conducts and the voltage at the plate P1 goes negative, thus P2 becomes positive while P1 becomes negative. This is the first stable state of the trigger and is termed the "on" or set condition and indicates that an information item is stored therein. In a similar manner, with the left triode conducting, the right triode may be rendered conductive by the application of a negative pulse to the reset terminal 43, whereupon the left triode stops conducting and the voltage at P1 going positive is applied via the cross-coupling connection to the grid G2, causing the right triode to conduct, P2 becoming negative. This is the second stable state of the trigger and is termed the "off" or reset condition and indicates that no information item is stored therein. Upon shifting of the trigger from one state to the other state, there is a steep rise in potential or positive going signal at the output terminal 59. The condition of a trigger is denoted by the small letter $x$ adjacent the side at which the tube is conducting. The trigger is hereinafter represented by a block containing the alphabetic character T and a numerical designation i. e. T–1.

Figure 6 illustrates the block diagram for the checking circuit of the present invention.

A source of negative pulses (not shown) is connected via the input terminal 76 to the reset terminals 43 of the triggers 78. The output terminal of each of the triggers 78 is connected via a corresponding cathode follower 80 to the set terminal of the succeeding trigger so as to form a cascade connected ring of triggers. The output terminal of the cathode follower 80a is also connected to the lower input terminals of the "or" circuit 84a and the "and" circuit 82a, respectively. The output terminals of the remaining cathode followers are also connected to the lower input terminals of the corresponding "or" circuits 84 and "and" circuits 82, respectively. The output terminals of the "or" circuits 84a and 84b are connected to the upper input terminals of the "or" circuits 84b and 84c and the upper input terminals of the "and" circuits 82b and 82c, respectively. The output terminal of the "or" circuit 84c is connected to the input terminal of the inverter 86. The output terminals of the "and" circuits 82 and the output terminal of the inverter 86 are connected to the input terminals of the "or" circuit 88. The output terminal of the "or" circuit 88 is coupled to the output terminal 90.

At the start of operation, let it be assumed that the trigger 78a is set to the "on" condition, while triggers 78b, 78c and 78d are in the reset or "off" condition as shown in Figure 6. The reset circuit is not shown but the setting of the triggers may be accomplished by any one of several well known means, for example, by delaying the application of the negative bias to the left grid of the trigger 78a and to the right grids of the remaining triggers.

The first negative pulse applied to the input terminal 76 shifts the trigger 78a to the "off" condition but has no effect on the other triggers of the ring as they are already in the "off" condition. As the trigger 78a shifts to the "off" condition a negative signal is developed at the output terminal thereof and is applied via the cathode follower 80a to the set terminal of the trigger 78b. This negative signal causes the trigger 78b to be set to the "on" condition. As the trigger 78b shifts to the "on" condition, a positive signal is emitted from its output terminal and is applied via the cathode follower 80b to the set terminal of the succeeding trigger 78c. This positive signal has no effect on the trigger 78c as the isolating diode of the trigger 78c blocks passage of positive signals. The next negative pulse applied to the input terminal 76 causes the trigger 78b to be reset to the "off" condition, which in turn, causes the trigger 78c to be set to the "on" condition in a manner as previously described. Thus, successive pulses applied to the input terminal 76 cause the operation of the ring of triggers to progress, by shifting the "on" condition from one trigger to the next such that one and only one of the plurality of triggers is in the "on" condition at any one instant of time.

If only the trigger 78a is in the "on" condition a positive signal is passed from the output terminal and via the cathode follower 80a and the "or" circuits 84 to the inverter 86. The inverter 86 produces a negative signal in response thereto which is passed via line 87 to the first input terminal of the "or" circuit 88. Since only the trigger 78a is in the "on" condition there is no coincidence of positive signals at the input terminals of any of the "and" circuits 82. Hence, the output terminals of the "and" circuits 82 and, consequently, the remaining input terminals of the "or" circuit 88 are maintained at negative potentials. Thus, since all of the input terminals of the "or" circuit 88 are at negative potentials, the output terminal 90 is maintained at a negative potential indicating that one and only one of the plurality of triggers 78 is in the "on" condition. Similarly, if any of the other triggers 78b, 78c or 78d are in the "on" condition, the positive signal produced thereby is passed by its corresponding "or" gate 84 and the succeeding "or" gates 84 to the inverter 86 where it is inverted to a negative signal and applied via line 87 to the first input terminal of the "or" circuit 88. Also, when one and only one of the plurality of triggers 78 is in the "on" condition there can never be coincidence of positive signals at any of the "and" circuits 82 and, consequently, the remaining input terminals of the "or" circuit 88 are at negative potentials causing the output terminal 90 to be maintained at a negative potential.

Let it now be assumed that none of the plurality of triggers 78 are in the "on" condition. Consequently, the output terminals of the triggers 78 are at negative potentials. Therefore, a negative signal is passed via the cathode followers 80 and the "or" circuits 84 to the inverter 86 where it is inverted to a positive signal and applied via line 87 to the first input terminal of the "or" circuit 88. The "or" circuit 88 in response thereto produces a positive signal which is fed to the output terminal 90 to indicate that none of the triggers 78 are in the "on" condition. Thus, a positive signal on line 87 indicates that none of the plurality of triggers 78 are in the "on" condition while a negative signal on line 87 indicates that at least one of the plurality of triggers 78 is in the "on" condition.

Now, let it be assumed that two of the plurality of triggers 78 are in the "on" condition, for example, triggers 78b and 78d. Consequently, the output terminals of the triggers 78b and 78d are at positive potentials. Therefore, a positive signal is fed from the trigger 78b via the cathode follower 80b, the "or" circuit 84a, the "or" circuit 84b to the upper input terminals of the "or" and "and" circuits 84c and 82c, respectively. Another positive signal is fed from the trigger 78d via the cathode follower 80d to the lower input terminals of the "or" and "and" circuits 84c and 82c, respectively. The "or" circuit 84c passes a positive signal which is inverted by the inverter 86 to a negative signal and is applied via line 87 to the first input terminal of the "or" circuit 88. Since there is no coincidence of positive signals at the input terminals of the "and" circuits 82a and 82b, these circuits provide negative signals via lines 81 and 83 to the lower two input terminals of the "or" circuit 88. However, there is a coincidence of positive signals at the input terminals of the "and" circuit 82c. Consequently, the "and" circuit 82c feeds a positive signal via line 85 to the remaining input terminal of the "or" circuit 88. Therefore, the "or" circuit 88 in response thereto produces a positive signal which is applied to the output terminal 90. Similarly, a positive signal on any of the other lines 81 and 83 indicate that more than one of the plurality of triggers 78 are in the "on" condition and will cause the "or" circuit 88 to pass a positive signal to the output terminal 90.

Thus, it is apparent that the presence of a negative signal at the output terminal 90 indicates that one and only one of the plurality of triggers 78 is in the "on" condition, while the presence of a positive or error signal at the output terminal 90 indicates that none or more than one of the plurality of triggers 78 are in the "on" condition. An indicator can be connected to the output terminal 90 to indicate the storage condition of the plurality of triggers 78, for example, one terminal of a neon tube may be connected to the output terminal 90 while the other terminal may be connected to a sufficiently negative potential such that a positive signal appearing at the output terminal 90 will cause the tube to glow and indicate that none or more than one of the plurality of triggers 78 are in the "on" condition. Though the circuit shown in Figure 6 illustrates a one-out-of-four checking circuit, it should be obvious that the invention can be applied to check any larger number of triggers as it would only be necessary to use the same equipment per stage as shown in Figure 6.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only by the scope of the following claims.

What is claimed is:

1. A storage checking circuit for a plurality of electronic bistable devices each of which has an "on" and "off" condition comprising sensing means associated with said plurality of electronic bistable devices for sensing the storage condition of said plurality of electronic bistable devices and indicator means responsive to said sensing means for producing an error indication whenever none or more than one of said plurality of electronic bistable devices is in an "on" condition.

2. A storage checking circuit for a plurality of triggers comprising means associated with said plurality of triggers for sensing whether one and only one of said plurality of triggers is in an "on" condition and means responsive to said sensing means for producing an error signal whenever none or more than one of said plurality of triggers are in the "on" condition.

3. A storage checking circuit for a plurality of storage devices each of which is capable of storing an information item comprising a first sensing means for sensing the storage condition of said plurality of storage devices and generating a negative signal when none of said plurality of storage devices have information items stored therein, a second sensing means for sensing the storage condition of said plurality of storage devices and generating a positive signal for each pair of said plurality of storage devices having information items stored therein, means responsive to said first sensing means for inverting the polarity of the signal produced thereby, and means responsive to the outputs of said second sensing means and said inverting means for generating a positive error signal whenever more than one or none of said plurality of storage devices have information items stored therein.

4. A storage checking circuit for a plurality of electronic bistable storage devices each of which has a first and second stable state comprising a first checking circuit for checking the state of said plurality of electronic bistable storage devices, said first checking circuit generating a predetermined signal when none of said plurality of electronic bistable storage devices are in the first stable state, a second checking circuit for checking the state of said plurality of electronic bistable storage devices and generating a signal whenever more than one of said plurality of electronic bistable storage devices are in the first stable state, and circuit means responsive to said checking circuits for generating an error signal whenever more than one or none of said plurality of electronic bistable storage devices are in the first stable state.

5. A storage checking circuit for a plurality of storage devices each of which is capable of storing an information item, a first plurality of checking circuits corresponding to each of said storage devices except the first, a second plurality of checking circuits corresponding to each of said storage devices except the first, the first checking circuit of said first and second plurality of checking circuits being jointly responsive to the storage condition of the first pair of said plurality of storage devices, each succeeding one of said first plurality of checking circuits and each succeeding one of said second plurality of checking circuits being jointly responsive to the output of the preceding one of said first plurality of checking circuits and the storage condition of the corresponding one of said plurality of storage devices, each of said first plurality of checking circuits generating a predetermined signal at the output thereof when none of the preceding storage devices or the corresponding storage device have information items stored therein, each of said second plurality of checking circuits generating a predetermined signal at the output thereof when at least one of the preceding storage devices and the corresponding storage device have information items stored therein, means coupled to the last checking circuit of said first plurality of checking circuits for inverting the predetermined signal produced by said last checking circuit, and means responsive to said inverted predetermined signal and said other predetermined signals for producing an indication whenever more than one or none of said plurality of storage devices have information items stored therein.

6. A storage checking circuit for a plurality of storage devices each of which is capable of storing an information item comprising a plurality of "or" circuits corresponding to each of said storage devices except the first, a plurality of "and" circuits corresponding to each of said storage devices except the first, the first of said plurality of "or" circuits and the first of said plurality of "and" circuits being jointly responsive to the storage condition of the first pair of said plurality of storage devices, each succeeding "or" circuit and each succeeding "and" circuit being jointly responsive to the output of the preceding "or" circuit and the storage condition of the corresponding one of said plurality of storage devices, each of said plurality of "or" circuits generating a first predetermined signal at the output thereof when none of the preceding storage devices or the corresponding storage device have information items stored therein, each of said plurality of "and" circuits generating a second predetermined signal at the output thereof when at least one of the preceding storage devices and the corresponding storage device have information items stored therein, means coupled to the last of said plurality of "or" circuits for inverting the polarity of the first predetermined signal produced by said last "or" circuit, and an auxiliary "or" circuit coupled to the outputs of said plurality of "and" circuits and to the output of said inverting means for generating an error signal whenever more than one or none of said plurality of storage devices have information items stored therein.

7. A storage checking circuit for a plurality of triggers comprising a plurality of cathode followers corresponding to each of said plurality of triggers, a plurality of "or" circuits corresponding to each of said plurality of triggers except the first, a plurality of "and" circuits corresponding to each of said plurality of triggers except the first, the first of said plurality of "or" and "and" circuits being jointly coupled via the first pair of said plurality of cathode followers to the first pair of said plurality of triggers respectively, each succeeding "or" and "and" circuit being jointly coupled to the preceding "or" circuit and via one of said plurality of cathode followers to a corresponding one of said plurality of triggers, each of said plurality of "or" circuits generating a negative signal if none of the preceding triggers or the corresponding trigger are in an "on" condition, each of said plurality of "and" circuits generating a positive signal if one of the preceding triggers and the corresponding trigger are in an "on" condition, an inverter for inverting the polarity of the signal produced by the last of said plurality of "or" circuits, and an auxiliary "or" circuit responsive to the signals produced by said inverter and said plurality of "and" circuits for generating a positive error signal whenever none or more than one of said plurality of triggers are in an "on" condition.

References Cited in the file of this patent

UNITED STATES PATENTS

| | | |
|---|---|---|
| 1,972,985 | Gardner | Sept. 11, 1934 |
| 2,557,964 | Herbst | June 26, 1951 |
| 2,674,727 | Spielberg | Apr. 6, 1954 |
| 2,694,491 | Perrin | Nov. 16, 1954 |
| 2,696,599 | Holbrook et al. | Dec. 7, 1954 |